Aug. 14, 1923.
C. STIRN
1,464,889
EXTENSIBLE TABLE AND HOT FOOD TRAY
Filed June 9, 1921
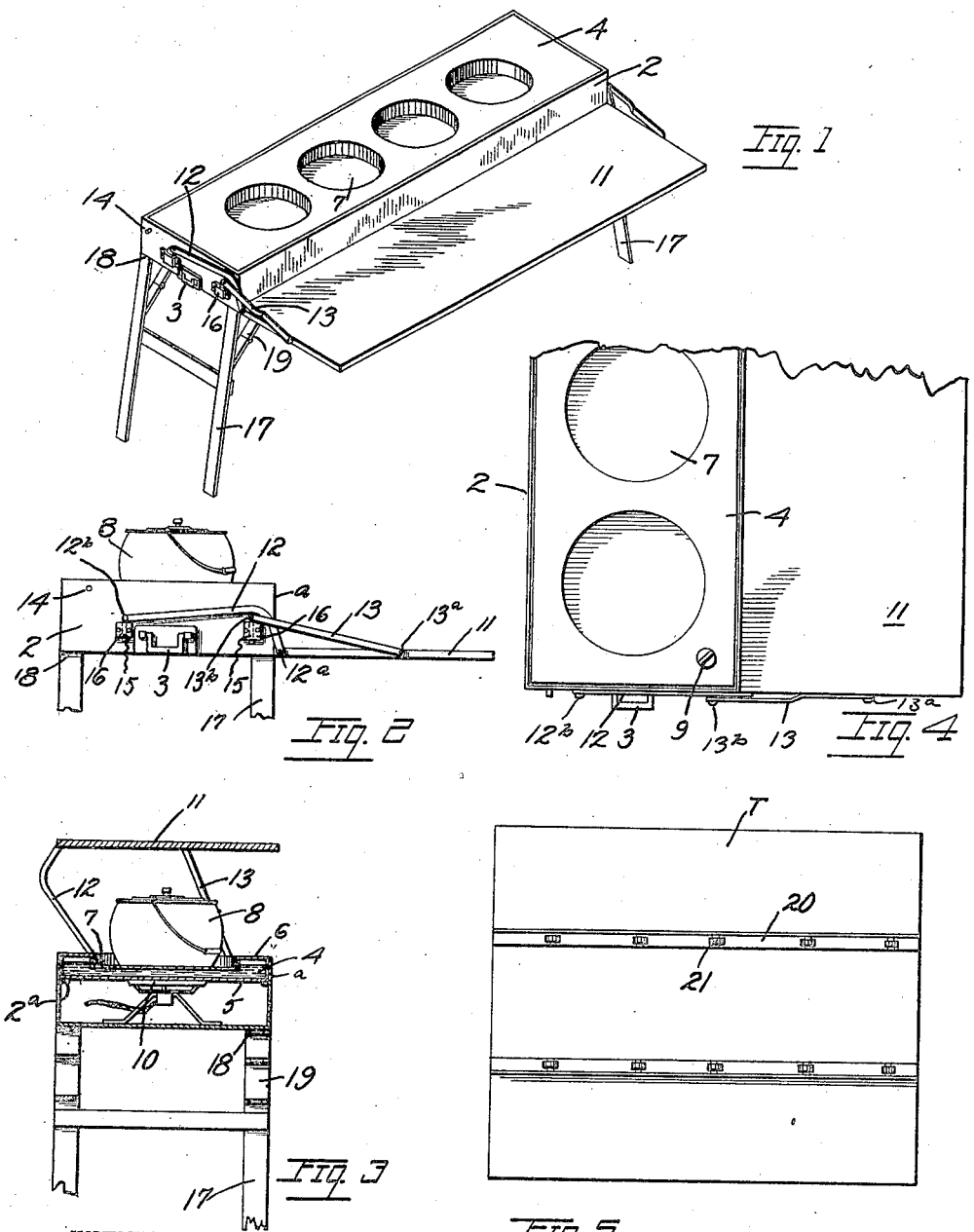
WITNESS
INVENTOR
CHARLES STIRN
BY
his ATTORNEYS Patented Aug. 14, 1923.

1,464,889

UNITED STATES PATENT OFFICE.

CHARLES STIRN, OF SAN FRANCISCO, CALIFORNIA.

EXTENSIBLE TABLE AND HOT-FOOD TRAY.

Application filed June 9, 1921. Serial No. 476,368.

*To all whom it may concern:*

Be it known that I, CHARLES STIRN, a subject of the Grand Duchess of Luxemburg, and a resident of the city and county of San Francisco, State of California, have invented a certain new and useful Improvement in an Extensible Table and Hot-Food Tray, of which the following is a specification.
This invention relates to meal serving apparatus.

It is one of the objects of the present invention to provide an apparatus or device which is adapted to be manually carried from place to place and which is capable of being compactly arranged so that it is especially useful for automobile touring purposes, for camping and for the service of hot meals in various institutions such as hotels, hospitals, etc.

It is one of the objects of the invention to provide a device which includes a heating means in the nature of a chamber to which heat may be provided as by an electric heating unit or other means and to provide in combination therewith, a removable tray forming, substantially, the cover of the heating chamber or stove and further, to provide a leaf or table forming part adapted to be readily shifted from a position arranged above the stove, and in which position the apparatus is adapted to be shifted from place to place and which table forming part is capable of being arranged at one side of the chamber and tray to serve for the supporting of food, dishes and other objects, as may be desired or necessary.

A further purpose of the invention is to provide a hot-food or meal serving device that may be deposited flat upon the ground or a bench or table and which also may be converted into a self-supporting table as by means of legs foldably attached to the device so that they may be adjusted to serve in the ordinary manner of table legs to support the superimposed parts.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Fig. 1 is a perspective showing the apparatus in the extended self-supporting table form.

Fig. 2 is an end view of the device showing the table leaf arranged along the side of the heating chamber with the parts in position to be disposed flat upon a surface such as a table top.

Fig. 3 is a cross section showing the table leaf in a position above the heating chamber for enabling manual transportation of the device.

Fig. 4 is a plan view of the device in the extended position, a part of the tray being broken away to illustrate a heating means therein.

Fig. 5 is a plan view of an ordinary dining table with tracks to receive a tray.

The preferred embodiment of the present invention includes a rectangular pan or stove or heating chamber of such length that it may be transported by a person when grasping the end handles provided for that purpose, and of such width as to provide an area enabling the positioning of a suitable set of cooking or food utensils upon a tray disposed in the top of the heating chamber. The invention further consists of an extension leaf preferably detachably connected to the heating pan or chamber and which leaf is adapted to be arranged and supported in a position substantially above the top of the utensils that may be provided on the tray and which leaf is shiftable laterally to occupy a position substantially in the plane of the bottom of the heating pan or chamber, thereby enabling the transposition of the contents of the utensils in the tray to dishes or other receivers that may be disposed on the top of the table leaf.

As here shown, a rectangular pan which constitutes a heating chamber 2, has at its ends preferably pivoted handles 3, to be grasped by a person for the convenient carrying of the device from place to place. The top of the pan 2, is open and is adapted to be closed or covered by a tray 4, having a bottom 5 and a top 6, the latter being depressed, either throughout its surface or at portions to form recesses or pockets 7, to receive complementary utensils 8. The bottom of the depressed portion or portions of the top 6, is preferably spaced somewhat above the true bottom 5, of the tray so that there is circulation space within the hollow tray structure for the flow of a fluid, such as water, which may be introduced within the tray through a suitable filling aperture having a cap 9.

The hollow tray is adapted to be slipped into the open top of a pan or chamber 2, and supported on suitable seat-forming flanges 2ª, in such position that the top 6, of the tray is substantially flush with the top edge of the pan 2. This tray is therefore, readily removable and may be kept in a clean and sanitary condition and its removal also provides ready access to the interior of the pan 2, in which there may be disposed any suitable heating means such, for instance, as an electric heating unit including a circular plate-like part 10, having a resistance coil energized by electricity from any suitable source.

From the above it will be seen that such a portable heating pan or chamber provides a convenient means for the transportation of hot food from place to place by an attendant and provides for keeping the food in a heated condition until it may be convenient to serve the same and for the purpose of increasing the utility of the apparatus, both for carrying additional food and also dinner dishes, there is provided a table forming leaf 11, of substantially the same length as the heating pan 2, and of the same or greater width, as may be desired, and this table leaf is adapted to be supported, in a horizontal position, elevated above the pan and utensils thereon preferably with one edge of the leaf 11, substantially in the plane of one of the sides of the pan so that the latter can be positioned close in front of the body of the attendant having to carry the device from place to place, but the opposite side edge of the leaf 11, may project considerably beyond the side of the pan 2, for the obvious reason that it will not interfere in carrying the device about. The table leaf may be supported in its elevated position by various means and also it may be supported in an extended position laterally alongside of the pan as shown in Fig. 2.

Preferably, a supporting means is utilized, which will also serve as a connection by which the table leaf may be transversely shifted from an elevated position above the pan 2, to its laterally disposed position. Also it is preferred that the table leaf and its connecting means may be wholly removed from the pan 2, so that the latter may be utilized independently of its associated extension leaf.

A simple, effective and practical means for connecting the leaf 11, to secure the positioning of the same in either of two positions and at the same time to maintain the leaf in a substantially horizontal position at all times during its movement, consists of pairs of links 12 and 13, respectively; a pair being arranged at each end of the pan and the leaf 2.

The links, while of such proportion, are so designed that the leaf 11, can be swung from its elevated position shown in Fig. 3, to the horizontal and laterally disposed position of Fig. 2. The links may also be so designed as to determine the limits of the downwardly swinging movement and are adapted by the engagement with a suitable stop, to determine the position of the leaf 11, in its elevated arrangement.

A suitable form of the links are shown in which each link 12, is pivotally connected at 12ª, to one edge or to opposite corners of the leaf on a common axis and the lower ends of the links 12, are pivoted at 12ᵇ, to the ends of the pan 2, on an axis at such position that the leaf 11, can be swung to its elevated position and limited, with one edge in the plane of the contiguous side wall 2.

The links 13, may be substantially straight in side elevation and at their outer ends are connected at 13ª, to the end edges of the leaf 11, and are pivoted at 13ᵇ, on an axis in the same horizontal plane with the axis 12ᵇ, of the links 12. This, therefore, enables the leaf 11, to be maintained in a horizontal position, or a position parallel to the part of the pan 2, at all times when it is being shifted. In order to bring the leaf in a position close to the side a, of the pan, the plane of the axes 12ᵇ and 13ᵇ, is somewhat above the bottom of the pan 2, and the length of the links is such, that the edge of the leaf that is pivoted to the links 12, will move in an arc close to, but clear the upper corners of the side a, of the pan and will readily clear the tops of utensils 8, or objects carried on the tray 4. Since the swinging ends of the links 12, pass below the axis of the pivots 13ᵇ, the outer portion of the links 12, are slightly bowed so as to clear the pivot connections 13ᵇ, of the link 13. And the pivoted ends of the links 13, may be offset outwardly from the ends of the pan 2, as shown in Fig. 4, to clear the swinging ends of the links 12, when the leaf is in its lowered position. Means to limit the movement of the leaf 11, to its upper position may comprise stop pins or other abutments 14, engaging the under side of the swinging links 12, and these links may also serve as limiting means by engagement of their bowed portions with the pivot connections 13ᵇ, of the links 13.

In order to provide for the entire removal of the extension leaf 11, from the heating pan and the tray, the pivot device 12ᵇ and 13ᵇ, may comprise rods 15, in the heads of which the pivoted ends of the links 12 and 13, may be pivoted; these rods being removably mounted in sockets 16, provided therefor on the ends of the pan 2.

From this it will be seen that food in containers 8, may be arranged in the tray 4, and this can be heated by the heating device 10. At the same time, cold food and usual dinner dishes and silverware may be carried on the table leaf 11, while this is supported in the upper position. As the swinging ends of the links 12 and 13, pass through vertical planes of the pivots 12$^b$ and 13$^b$, the weight of the leaf 11, and the load thereon, pressing the links against the stops 14, render the leaf stable and unlikely to be freely shifted during transportation. After the pan 2, has been deposited upon any suitable support, as a shelf, bench, leaf or other device, then it is only necessary to pull the leaf 11, from the elevated position over to the side $a$, of the pan, thus exposing the utensils 8, and the tray 4, and providing for convenient adjustment of the dinner pieces upon the table leaf and enabling the ready access to the utensils.

For camping, and for use in cars and on boats where no convenient and suitable support is at hand, the device may be rendered self-supporting by suitable means as, for instance, comprising pairs of end legs 17, hingedly connected at 18, to the bottom end corners of the pan 2, and which legs may be braced when in the position shown in Fig. 1, as by means of knuckle jointed bracing links 19, having ends connected to the legs 17, and to the bottom of the pan 2. Preferably the legs are of such form and so connected to the bottom of the pan that they may be folded compactly in underneath the pan so as to not interfere with the disposition of the same upon a plane surface when desired.

Fig. 5 is a plan view of the top of a standard dinner table of any construction and on which is arranged a pair of tracks 20, onto which the pan 2, is adapted to be disposed in cases where it is not necessary or desirable to utilize the extension leaf 11. Of course when so used, the legs are omitted. These tracks may be applied to the top of the table T, as a unit and may be provided with anti-friction means, as rollers 21, arranged on horizontal axes at suitable intervals along the tracks 20. This will enable the pan 2, to be conveniently and easily shifted into the desired position on the tracks.

What is claimed is:

1. A portable food server having a chamber and a heating means, a removable tray forming, when applied, a cover for the chamber and for carrying applied articles, and a table leaf shiftable from a superimposed position above the loaded tray to a position alongside the tray.

2. A portable food server having a chamber and a heating means, a removable tray forming, when applied, a cover for the chamber and for carrying applied articles, and a table leaf shiftable from a superimposed position above the loaded tray to a position alongside the tray substantially in the plane of the bottom of the chamber.

3. A portable food server having a chamber and a heating means, a removable tray forming, when applied, a cover for the chamber and for carrying applied articles, and a table leaf shiftable from a superimposed position above the loaded tray to a position alongside the tray, and being detachably connected to the chamber.

4. A portable food server having a chamber and a heating means, a removable tray forming, when applied, a cover for the chamber and for carrying applied articles, a table leaf shiftable from a superimposed position above the loaded tray to a position alongside the tray, and means at the ends of the chamber for supporting the table leaf in either of its positions.

5. A portable food server having a chamber and a heating means, a removable tray forming, when applied, a cover for the chamber and for carrying applied articles, a table leaf shiftable from a superimposed position above the loaded tray to a position alongside the tray, and means for supporting the table leaf in either of its positions and for maintaining the leaf in a substantially horizontal position during its movement from the superimposed position to the lateral position.

6. A portable food server having a chamber and a heating means, a removable tray forming, when applied, a cover for the chamber and for carrying applied articles, a table leaf shiftable from a superimposed position above the loaded tray to a position alongside the tray, and means comprising pairs of parallel links at the ends of the chamber connected, at their swinging ends, to the table leaf.

In testimony whereof, I have hereunto set my hand.

CHARLES STIRN.